(12) United States Patent
Ohishi

(10) Patent No.: US 12,235,092 B2
(45) Date of Patent: Feb. 25, 2025

(54) DETECTION DEVICE AND IMAGE FORMING APPARATUS

(71) Applicant: Shinya Ohishi, Kanagawa (JP)

(72) Inventor: Shinya Ohishi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 380 days.

(21) Appl. No.: 17/746,962

(22) Filed: May 18, 2022

(65) Prior Publication Data

US 2022/0381554 A1  Dec. 1, 2022

(30) Foreign Application Priority Data

May 26, 2021 (JP) .................. 2021-088292

(51) Int. Cl.
*G01B 11/06* (2006.01)
*G03G 15/00* (2006.01)

(52) U.S. Cl.
CPC ..... *G01B 11/0691* (2013.01); *G03G 15/5029* (2013.01)

(58) Field of Classification Search
CPC .......... G01B 11/0691; G03G 15/5029
See application file for complete search history.

(56) References Cited

U.S. PATENT DOCUMENTS

| 8,419,014 B2* | 4/2013 | Yamagishi ............. B65H 3/063 271/262 |
| 2005/0228535 A1* | 10/2005 | Simonis .................. B65H 7/20 700/228 |
| 2009/0037018 A1* | 2/2009 | Saikawa .................. G06K 7/08 700/223 |
| 2013/0032993 A1* | 2/2013 | Izumiya .................. B65H 7/10 271/227 |
| 2020/0216277 A1 | 7/2020 | Ohishi et al. |
| 2020/0379396 A1 | 12/2020 | Ohishi |
| 2022/0258996 A1* | 8/2022 | Sakai ..................... B65H 5/062 |

FOREIGN PATENT DOCUMENTS

| JP | 6-040604 | 2/1994 |
| JP | 2012-002935 | 1/2012 |
| JP | 2014-172387 | 9/2014 |

* cited by examiner

*Primary Examiner* — David H Banh
(74) *Attorney, Agent, or Firm* — XSENSUS LLP

(57) ABSTRACT

A detection device and an image forming apparatus. The detection device includes a size sensor to detect a size of a sheet in a direction of conveyance, the sheet being conveyed when detected by the size sensor, a thickness sensor to detect a thickness of the sheet, and circuitry to determine whether a disparity in sizes is occurring to the sheet or a fed-with-overlap error is occurring to the sheet, based on the thickness of the sheet detected by the thickness sensor. The image forming apparatus includes a detection device including a size sensor to detect a size of a sheet in a direction of conveyance, a thickness sensor to detect a thickness of the sheet, and circuitry to determine whether a disparity in sizes is occurring to the sheet or a fed-with-overlap error is occurring to the sheet, based on the thickness of the sheet.

14 Claims, 4 Drawing Sheets

DETECTION DEVICE AND IMAGE FORMING APPARATUS

CROSS-REFERENCE TO RELATED APPLICATION

This patent application is based on and claims priority pursuant to 35 U.S.C. § 119(a) to Japanese Patent Application No. 2021-088292, filed on May 26, 2021, in the Japan Patent Office, the entire disclosure of which is hereby incorporated by reference herein.

BACKGROUND

Technical Field

Embodiments of the present disclosure relate to a detection device that determines whether a sheet is being conveyed under normal operating conditions, and an image forming apparatus such as a copier, a printer, a facsimile machine, a multifunction peripheral (MFP) that includes the functionality of the copier, the printer, and the facsimile machine, or a printing machine. According to embodiments of the present disclosure, the image forming apparatus is provided with the detection device.

Background Art

In the related art, an image forming apparatus such as a copier, a printer, or a printing machine that determines whether a sheet such as a sheet of paper is being conveyed under normal operating conditions is known in the art.

Moreover, technologies are known in the art in which a sensor that detects the thickness of a sheet that is being conveyed is arranged to determine whether sheets are fed in pair based on the results of detection obtained by the sensor.

SUMMARY

Embodiments of the present disclosure described herein provide a detection device and an image forming apparatus. The detection device includes a size sensor configured to detect a size of a sheet in a direction of conveyance, the sheet being conveyed when detected by the size sensor, a thickness sensor configured to detect a thickness of the sheet, and circuitry configured to determine whether a disparity in sizes is occurring to the sheet or a fed-with-overlap error is occurring to the sheet, based on the thickness of the sheet detected by the thickness sensor. The image forming apparatus includes a detection device including a size sensor configured to detect a size of a sheet in a direction of conveyance, the sheet being conveyed when detected by the size sensor, a thickness sensor configured to detect a thickness of the sheet, and circuitry configured to determine whether a disparity in sizes is occurring to the sheet or a fed-with-overlap error is occurring to the sheet, based on the thickness of the sheet detected by the thickness sensor.

BRIEF DESCRIPTION OF DRAWINGS

A more complete appreciation of embodiments and the many attendant advantages thereof will be readily obtained as the same becomes better understood by reference to the following detailed description when considered in connection with the accompanying drawings.

Figure 1:
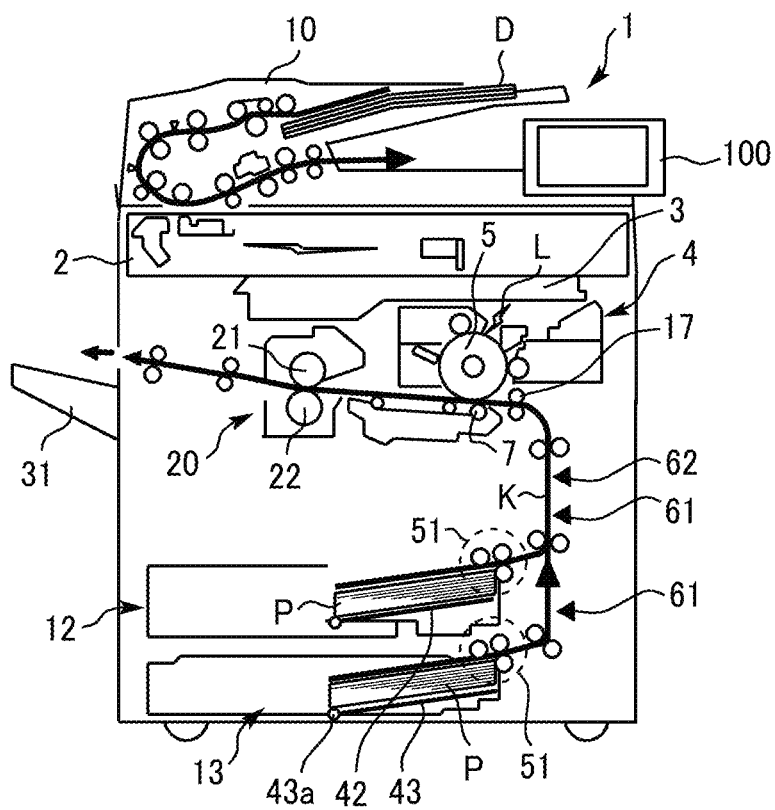
FIG. 1 is a schematic diagram of an overall configuration of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

Embodiments of the present disclosure are described below in detail with reference to the drawings. In the drawings, like reference signs denote like elements, and overlapping description may be simplified or omitted as appropriate.

Firstly, an overall configuration and operation of an image forming apparatus 1 is described below with reference to FIG. 1.

In FIG. 1, the image forming apparatus 1 that serves as a copier, a document reading device 2 that optically reads the image data on a document D, an exposure device 3 that irradiates a photoconductor drum 5 with exposure light L based on the image data read by the document reading device 2, an image forming unit 4 that forms a toner image on the photoconductor drum 5, and a transfer device 7 that serves as an image forming device and transfers the toner image formed on the photoconductor drum 5 to a sheet P are illustrated.

Moreover, a document conveyance unit 10 that serves as an automatic document feeder and conveys a set document D to the document reading device 2, and a pair of feeding devices 12 and 13 each of which feeds the sheet P stored in a sheet tray are illustrated in FIG. 1.

Further, a registration roller pair 17 that serves as a timing roller pair that conveys the sheet P toward the transfer device 7, a fixing device 20 that fixes a not-yet-fixed toner image borne on the sheet P, a fixing roller 21 provided for the fixing device 20, a pressure roller 22 provided for the fixing device 20, and an output tray 31 on which the multiple sheets P ejected from the housing of the image forming apparatus 1 are stacked are illustrated in FIG. 1.

Moreover, a pair of placement plates 42 and 43 that serves as a pair of lifting and lowering plates and are configured to be able to be lifted and lowered in the pair of feeding devices 12 and 13, respectively, and a feeding mechanism 51 as a feeding unit installed in each of the feeding devices 12 and 13 are illustrated in FIG. 1.

Further, a size sensor 61, a thickness sensor 62, and an operation panel 100 through which what is to be printed by the image forming apparatus 1 is input or that displays the status of the image forming apparatus 1 are illustrated in FIG. 1. The size sensor 61 and the thickness sensor 62 together configure a detection device 60 according to the present embodiment (see FIG. 3).

The image forming operation or printing operation of the image forming apparatus 1 under normal operating conditions is described below with reference to FIG. 1.

Firstly, the document D is fed and conveyed in the direction indicated by an arrow in FIG. 1 from the sheet tray 30 by the conveyance rollers of the document conveyance unit 10, and passes over the document reading device 2. By so doing, the document reading device 2 optically reads the image data of the document D that passes above the document reading device 2.

The optical image data that is read by the document reading device 2 is converted into an electrical signal and then is sent to the exposure device 3 that serves as a writing device. Then, the exposure light L such as a laser beam that is based on the image data indicated by the received electrical signal is emitted from the exposure device 3 toward the photoconductor drum 5 of the image forming unit 4.

On the other hand, in the image forming unit 4 according to the present embodiment, the photoconductor drum 5 rotates in a clockwise direction as illustrated in FIG. 1, and a toner image that is based on the image data is formed on the photoconductor drum 5 through the predetermined image forming processes such as charging processes, exposure processes, and developing processes.

Subsequently, the image formed on the photoconductor drum 5 is transferred onto a sheet P conveyed by a registration roller pair 17 in a transfer device 7 as an image forming device.

On the other hand, the sheet P that is conveyed to the transfer device 7, which serves as an image forming device, is processed as follows.

Firstly, one of the pair of feeding devices 12 and 13 of the image forming apparatus 1 is automatically or manually selected. In the present embodiment, it is assumed that, for example, the feeding device 13 on the downside is selected. Then, the uppermost one of the sheets P stored in the feeding device 13 is fed by the feeding mechanism 51 and conveyed toward the conveyance path K. Subsequently, the sheet P passes through a conveyance path K in which a plurality of conveyance rollers, a size sensor 61, and a thickness sensor 62 are arranged, and reaches the position of the registration roller pair 17. At that time, the front end of the sheet P contacts the nip of the registration roller pair 17 that is not rotating. As a result, the skew of the sheet P is corrected.

Then, the registration roller pair 17 starts rotating, and the sheet P is conveyed toward the transfer device 7 that serves as an image forming device, according to the tuning of the image formed on the photoconductor drum 5, in order to be aligned with the image formed on the photoconductor drum 5. Then, in the transfer device 7, the image that is formed on the photoconductor drum 5 is transferred onto the sheet P. The above series of processes may be referred to as the transferring steps in the following description.

Then, after passing through the position of the transfer device 7, the sheet P after the transfer process reaches the fixing device 20 through a conveyance path. The sheet P that has reached the fixing device 20 is fed between the fixing roller 21 and the pressure roller 22, and the toner image is fixed by the heat received from the fixing roller 21 and the pressure received from both the fixing roller 21 and the pressure roller 22. The above series of processes may be referred to as the fixation steps in the following description. The sheet P onto which the toner image has been fixed after the fixation steps is sent out from the fixing nip between the fixing roller 21 and the pressure roller 22 and then is ejected from the housing of the image forming apparatus 1. Finally, the sheet P is stacked on the output tray 31 as an output image.

Thus, a series of image forming processes is completed. The above series of processes may be referred to as the printing operation in the following description.

The feeding device according to the present embodiment is described below in detail with reference to, for example, FIG. 2.

Among the pair of feeding devices 12 and 13 that are arranged inside the image forming apparatus 1, the feeding device 13 on the downside is described below. However, the upper feeding device 12 has substantially the same configuration as that of the lower feeding device 13 except that the installation position thereof is different, and thus the description thereof will be omitted.

Figure 2:
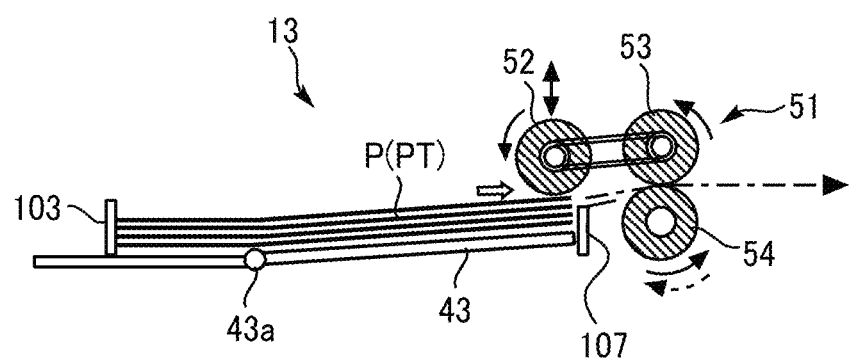
FIG. 2 is a schematic diagram illustrating a configuration of a feeding device, according to an embodiment of the present disclosure.

As illustrated in, for example, FIG. 2, the feeding device 13 is provided with, for example, a placement plate 43 formed so as to be able to stack a plurality of sheets P, and a feeding mechanism 51 configured to feed the sheets P placed on the placement plate 43.

A part of the placement plate 43 is configured to be movable up and down such that a downstream portion of the uppermost-placed sheet P in the feeding direction (on the right side in FIG. 2) reaches a predetermined height equivalent to the position of the pickup roller 52. More specifically, the placement plate 43 includes a lifting and lowering plate that is rotatable around a central axis 43*a* of the rotation and a fixed plate that does not lift and lower anything. The lifting and lowering plate is arranged downstream from the fixed plate in the feeding direction and is configured to move up and down by rotating around the central axis 43*a* of the rotation in forward and reverse directions.

As illustrated in FIG. 2, the feeding mechanism 51 includes, for example, a feed roller 53, a pickup roller 52, and a separation roller pair 54.

The feed roller 53 is arranged on the front-end side of the sheet downstream from the sheet P placed on the placement plate 43 in the feeding direction as indicated by the hollow arrow in FIG. 2, and rotates in a counterclockwise direction as illustrated in FIG. 2 to make movement in the feeding direction of the sheet P while contacting the top surface of the sheet P placed uppermost on the placement plate 43. As a result, the sheet P is fed in the feeding direction indicated by an arrow of alternate long and short dashed lines as illustrated in FIG. 2.

The pickup roller 52 according to the present embodiment rotates in a counterclockwise direction as illustrated in FIG.

2 to make movement in the direction of travel while contacting the top surface of the sheet P placed uppermost on the placement plate 43. As a result, the sheet P is conveyed toward the position of the feed roller 53. Moreover, the pickup roller 52 according to the present embodiment is configured in a detachable manner from the sheet P placed uppermost on the placement plate 43 that may be lifted or lowered. In other words, the pickup roller 52 according to the present embodiment is arranged in a movable manner between a retracted position where the roller does not contact the sheet P placed on the placement plate 43 and a pressing position as illustrated in FIG. 2 where the roller contacts and presses the sheet P placed on the placement plate 43.

The separation roller pair 54 is arranged so as to form a nip between the separation roller pair 54 and the feed roller 53.

More specifically, when one sheet P is nipped at the nip and when the sheet P is not nipped at the nip, the separation roller pair 54 rotates in the forward direction, i.e., a clockwise direction as indicated by an arrow with a broken line in FIG. 2 to make movement in the feeding direction. By contrast, when a plurality of sheets are nipped at the nip, the separation roller pair 54 rotates in a reverse direction to the above-described forward direction. In other words, the roller pair rotates in a counterclockwise direction as indicated by an arrow with a solid line in FIG. 2. As a result, the sheet P that is placed uppermost among the multiple sheets P nipped at the nip is conveyed in the feeding direction as the feed roller 53 rotates, and the sheet P on the downside is conveyed in a reverse direction to the feeding direction and the forward direction. As a result, the number of fed-in-pair errors and fed-with-overlap errors of the sheets P can be reduced.

In the present embodiment, a plate-shaped separation pad may be used in place of the separation roller pair 54.

In the present embodiment, in the feeding device 13 according to the present embodiment, the placement plate 43 that serves as a lifting and lowering plate is lifted or lowered in the up-and-down directions depending on the number of sheets P stacked on the placement plate 43 such that the pickup roller 52 can contact the uppermost sheet P stacked on the placement plate 43 that serves as a lifting and lowering plate, After the position of the placement plate 43 in the up-and-down directions has been adjusted and the pickup roller 52 moves downward and contacts the top surface of the sheet P placed uppermost on the placement plate 43 that serves as a lifting and lowering plate, the feeding operation for the sheet P starts.

The feeding device 13 according to the present embodiment is provided with a pair of side fences that restrict the positions of the sheet P placed on the placement plate 43. More specifically, the pair of side fences restrict the positions of the sheet P in the width direction, and the width direction of the sheet P is orthogonal to the front-to-rear end direction of the sheet P and the thickness direction of the sheet P as illustrated in FIG. 2. The pair of side fences are installed at both ends in the width direction so as to sandwich the sheet P, and are configured to be movable in conjunction with each other according to the size of the sheet P in the width direction by a manual movement mechanism. In other words, the pair of fences are configured such that the space in the width direction of the sheet P can be widened and shortened.

The feeding device 13 according to the present embodiment is provided with a base fence 107 and an end fence 103 that together restrict the positions of the sheet P placed on the placement plate 43. More specifically, the base fence 107 and the end fence 103 together restrict the positions of the sheet P in the feeding direction, and the feeding direction of the sheet P is parallel to the front-to-rear end direction of the sheet P and the right and left directions in FIG. 2. The base fence 107 is arranged such that the front end of the sheet P contacts the base fence 107. In other words, the base fence 107 is arranged such that a downstream portion of the sheet in the feeding direction contacts the base fence 107. The end fence 103 is arranged so as to contact the rear end of the sheet P. In other words, the end fence 103 is arranged such that an upstream portion of the sheet P in the feeding direction contacts the end fence 103, The end fence 103 is configured to be movable according to the size of the sheet P in the feeding direction by a manual movement mechanism.

In the feeding device 13 configured as described above, an end sensor detects that the sheet P is not set on the placement plate 43, and the pickup roller 52 is retracted to a retracted position.

When the end sensor detects that all the sheets P are newly set on the placement plate 43, the pickup roller 52 moves from the retracted position to the pressing position as illustrated in FIG. 2.

Then, as illustrated in FIG. 2, the pickup roller 52 starts rotating in a counterclockwise direction while the pickup roller 52 is contacting the top surface of the sheet P placed uppermost on the placement plate 43, and the feed roller 53 and the separation roller pair 54 also start rotating at the same time. As a result, the uppermost sheet P of the sheet bundle PT that is placed on the placement plate 43 by the pickup roller 52 is conveyed toward the nip between the feed roller 53 and the separation roller pair 54, Further, one sheet P is separated from the nip, and is conveyed toward the image forming device.

When the end sensor detects that all the sheets P placed on the placement plate 43 are fed and no sheet P is set on the placement plate 43, the pickup roller 52 moves to the retracted position again.

The detection device 60 of the image forming apparatus 1 according to the present embodiment is described below with reference to, for example, FIG. 3A, FIG. 3B, FIG. 3C, FIG. 3D, FIG. 4A, FIG. 4B, FIG. 4C, FIG. 4D, and FIG. 5.

main The detection device 60 according to the present embodiment is a device that detects whether the sheet P is conveyed under normal operating conditions, and is arranged in the conveyance path K running from the feeding devices 12 and 13 to the registration roller pair 17 (see FIG. 3A, FIG. 3B, FIG. 3C, and FIG. 3D).

In particular, the detection device 60 detects and distinguishes the following four states.

First State

Figure 3A:
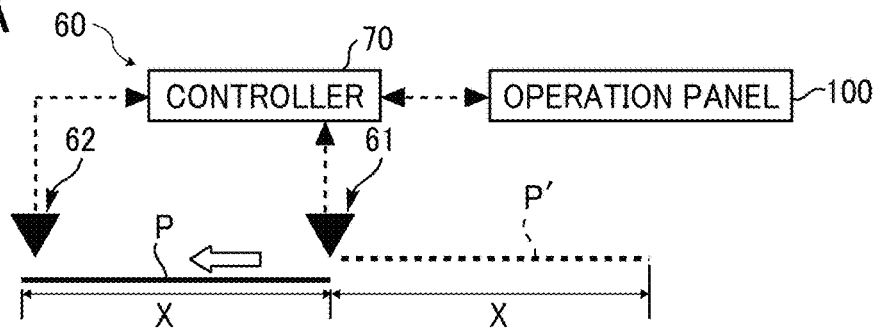
FIG. 3A, FIG. 3B, FIG. 3C, and FIG. 3D are diagrams each illustrating a state of a sheet to be detected by a detection device while the sheet is being conveyed, according to an embodiment of the present disclosure.

A state in which the sheet P is being conveyed under normal operating conditions is referred to as a first state (see FIG. 3A).

Second State

Figure 3B:
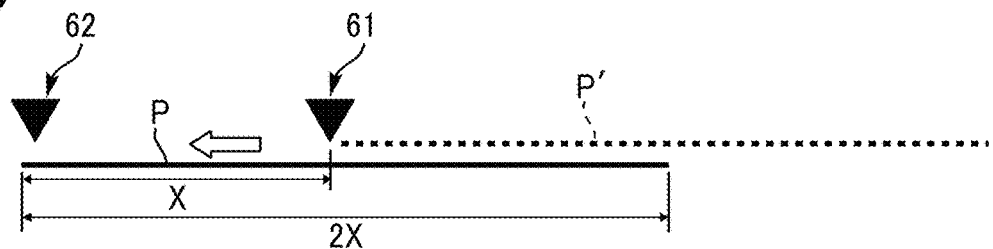

A state in which the sheet P of a size different from an expected size is being conveyed is referred to as a second state (see FIG. 3B). The second state may be referred to as a disparity in sizes in the following description.

Third State

Figure 3C:
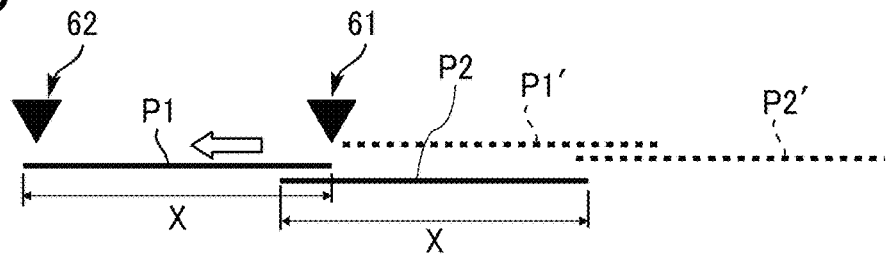

A state in which a plurality of sheets P1 and P2 that partially overlap with each other are being conveyed is referred to as a third state (see FIG. 3C). The third state may be referred to as a fed-with-overlap error in the following description.

Fourth State

Figure 3D:
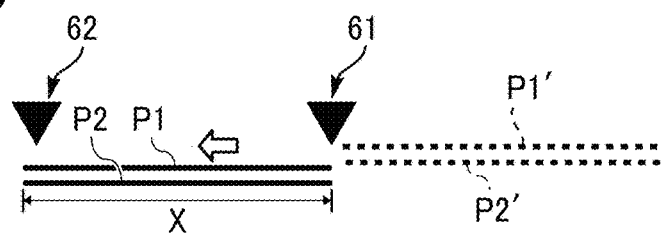

A state in which a plurality of sheets P1 and P2 that overlap with each other in their entirety are being conveyed is referred to as a fourth state (see FIG. 3D). The fourth state may be referred to as a fed-in-pair error in the following description.

For example, a disparity in sizes occurs when a plurality of sheets P of different sizes are set on the feeding devices 12 and 13.

As illustrated in FIG. 3A, FIG. 3B, FIG. 3C, and FIG. 3D (and FIG. 1), in the present embodiment, the detection device 60 is provided with a size sensor 61 that serves as size detection means and a thickness sensor 62 that serves as thickness detection means.

The size sensor 61 according to the present embodiment is a sensor that detects the size of the sheet P being conveyed in the direction of conveyance. The size sensor 61 according to the present embodiment may be any known sensor such as a reflective photosensor that optically detects the presence or absence of the sheet P at that position. Then, based on the results of the detection performed by the size sensor 61, the size of the sheet P in the direction of conveyance is converted by the controller 70 that serves as a processor composed of at least one integrated circuit.

The thickness sensor 62 according to the present embodiment detects the thickness H of the sheet P being conveyed. The thickness sensor 62 according to the present embodiment may be any known sensor such as a range finder (RF) that optically measures the distance to the surface of the sheet P at that position. Then, based on the results of the detection performed by the thickness sensor 62, the thickness of the sheet P is converted by the controller 70 that serves as a processor composed of at least one integrated circuit.

The thickness sensor 62 according to the present embodiment is arranged downstream from the size sensor 61 in the direction of conveyance. In FIG. 3A, FIG. 3B, FIG. 3C, and FIG. 3D, the thickness sensor 62 is disposed on the left. In FIG. 3A, FIG. 3B, FIG. 3C, and FIG. 3D, a hollow arrow indicates a direction of conveyance in which the sheet P is conveyed.

In the present embodiment, when the size data obtained in advance about the size of the sheet P being conveyed in the direction of conveyance does not match the size in the direction of conveyance detected by the size sensor 61, the detection device 60 according to the present embodiment distinguishes a disparity in sizes of the sheet P being conveyed from a fed-with-overlap error occurring to the sheet P being conveyed, based on the detection results of the thickness sensor 62. Such distinguishing processes may be referred to as classification where appropriate in the following description.

In the present embodiment, the controller 70 acquires and stores the size data based on the information about the printing or the sheet P that is input in advance through the operation panel 100.

Alternatively, the size data can be directly acquired based on the result of detection obtained by a sensor that detects the position of the end fence 103 (see FIG. 1 of the feeding device 12 or the feeding device 13. In such cases, a disparity in sizes occurs due to, for example, an operational failure or positional failure) of the end fence 103.

More specifically, classification is performed based on variations in the detection results of the thickness sensor 62 within a prescribed length of time T determined by the information such as the size data acquired by the controller 70.

More specifically, the above-described prescribed length of time T is about the length of time elapsed since the front end of the sheet P whose size is equivalent to that of the size data has passed the position of the thickness sensor 62 under normal operating conditions until the rear end of the sheet P has gone through, and may increase or decrease depending on the size of the sheet P in the direction of conveyance. In other words, the prescribed length of time T that is set when a sheet P of A3 size is to be passed is longer than the prescribed length of time T that is set when a sheet P of A4 size is to be passed.

When there is no variation exceeding the prescribed value a in the detection result of the thickness sensor 62 within the prescribed length of time T (H2≤H1×α), it is determined that a disparity in sizes is present. By contrast, when there is a variation exceeding the prescribed value a in the detection result of the thickness sensor 62 within the prescribed length of time T (H2>H1×α), it is determined that a fed-with-overlap error is present. These processes will be described later as steps S11 to S13 in FIG. 5.

When the information such as the size data matches the size in the direction of conveyance detected by the size sensor 61, whether a fed-in-pair error is occurring to the conveyed sheet P is determined based on the detection results of the thickness sensor 62. These processes will be described later as steps S6 to S8 in FIG. 5.

The reason why such controlling processes are valid will be described below with reference to FIG. 3A, FIG. 3B, FIG. 3C, FIG. 3D, FIG. 4A, FIG. 4B, FIG. 4C, FIG. 4D, and FIG. 5.

Firstly, in FIG. 3A, FIG. 3B, FIG. 3C, and FIG. 3D, it is assumed that the size data of the sheet P that is input through the operation panel 100 is X such as A4 size.

The sheet P that is fed from the feeding device such as the feeding device 13 on the downside is conveyed in the conveyance path K in the direction as indicated by hollow arrow in FIG. 3A, FIG. 3B, FIG. 3C, and FIG. 3D. Then, the sheet P passes through the position of the size sensor 61, and passes through the position of the thickness sensor 62.

FIG. 3A illustrates the operation to be performed when a sheet P of a predetermined size X passes, according to the present embodiment. In such an operation, the controller 70 detects the size X of the sheet P in the direction of conveyance based on the time difference between when the output from the size sensor 61 is turned on and when the output from the size sensor 61 is turned off. In other words, the controller 70 according to the present embodiment detects the size X of the sheet P in the direction of conveyance based on the length of time elapsed since the front end of the sheet P has passed until the rear end of the sheet P has gone through.

In FIG. 3A, FIG. 3B, FIG. 3C, and FIG. 3D, a sheet P' that is indicated by a broken line indicates a state in which the front end of the sheet has reached the size sensor 61, a sheet P that is indicated by a solid line indicates a state in which the rear end of the sheet P has passed the size sensor 61. In other words, a sheet P' that is indicated by a broken line indicates a timing at which the output from the sensor is switched from a turned-off state and turned on, and the sheet P that is indicated by a solid line indicates a timing at which the output from the sensor is switched from a turned-on state and turned off.

In FIG. 3A, FIG. 3B, FIG. 3C, and FIG. 3D, X denotes the approximate distance between the size sensor 61 and the thickness sensor 62. However, no limitation is indicated thereby, and the approximate distance between the size sensor 61 and the thickness sensor 62 may have any desired value. Various kinds of size sensors 61 (see FIG. 1) may be used depending on the pair of feeding devices 12 and 13 or the feeding paths that are adopted.

As illustrated in FIG. 3A, when a sheet P of a predetermined size X passes, the size sensor 61 is turned on and off at a timing just as desired. The distance for which the sheet P is conveyed is divided by the conveyance speed of the sheet P, and a margin time is added to the obtained value. The size sensor 61 is turned on or turned off within the length of time that corresponds to the above-obtained value to which the margin time is added. In other words, when the size sensor 61 is not turned on and off at a timing just as desired, there is a possibility that the conveyed sheet P is not of the predetermined size X.

FIG. 3B illustrates the operation to be performed when a sheet P of a size different from a predetermined size X (size data) passes, according to the present embodiment. For example, in FIG. 3B, the sheet P of a size 2X twice larger than the predetermined size X is about to pass, and such operation may be referred to as the operation to be performed when a disparity in sizes is detected. In such cases, the timing at which the output of the size sensor 61 is switched from a turned-on state to a turned-off state is delayed compared with the timing when a sheet P of the desired size X is passed.

In FIG. 3C, the operation to be performed when a plurality of sheets P1 and P2 of a predetermined size X are fed with overlap is illustrated. Also in such cases, the timing at which the output of the size sensor 61 is switched from a turned-on state to a turned-off state is delayed compared with the timing when a sheet P of the desired size X is passed.

Accordingly, it is difficult for the size sensor 61 to distinguish between a disparity in sizes occurring as illustrated in FIG. 3B and a fed-with-overlap error occurring as illustrated in FIG. 3C. In particular, when an overlapping region between the sheet P1 and the sheet P2 is short, it is difficult to distinguish such a fed-with-overlap error from a disparity in sizes.

In the present embodiment, in order to handle such a problem that a disparity in sizes and a fed-with-overlap error cannot be distinguished from each other, the thickness sensor 62 that is arranged downstream from the size sensor 61 detects the sheet thickness of the sheet P1 and the sheet P2.

Figure 4A:
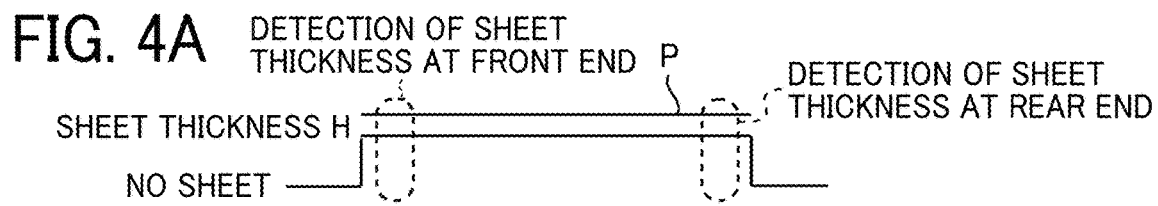
FIG. 4A, FIG. 4B, FIG. 4C, and FIG. 4D are diagrams each illustrating a mode of detection performed by a thickness sensor, according to an embodiment of the present disclosure.

First of as illustrated in FIG. 4A, when a sheet P having a predetermined size X passes as in the sheet-passing state of FIG. 3A, the thickness sensor 62 outputs a value of the sheet thickness H for the length of time corresponding to the length X.

Figure 4B:
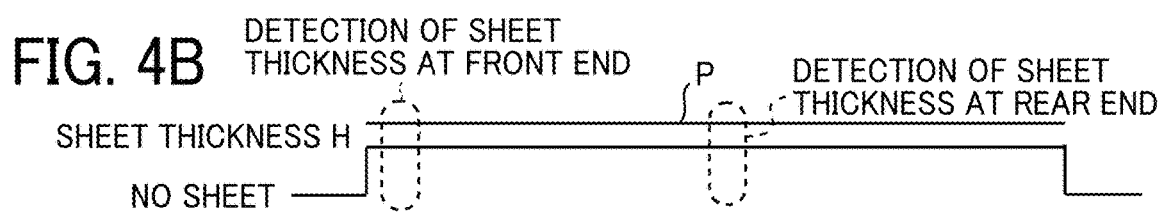

By contrast, as illustrated in FIG. 4B, when a sheet P having an unexpected size passes as in the sheet-passing state of FIG. 3B, the thickness sensor 62 outputs a value of the sheet thickness H for the length of time corresponding to the size 2X.

In the present embodiment, the thickness sensor 62 detects the sheet thickness H1 of the front end of the sheet P of a predetermined size X and the sheet thickness H2 of the rear end of the sheet P of the predetermined size X. In other words, two detection results of the thickness sensor 62 within a certain length of time as described above are obtained. Accordingly, in the case of FIG. 4A and FIG. 4B, both the sheet thickness H1 at the front end and the sheet thickness H2 at the rear end are equal to the sheet thickness H of one sheet as follows.

$$H1=H2=H$$

On the other hand, the results of detection of the thickness sensor 62 within the prescribed length of time T may be obtained in a continuous manner.

Figure 4C:
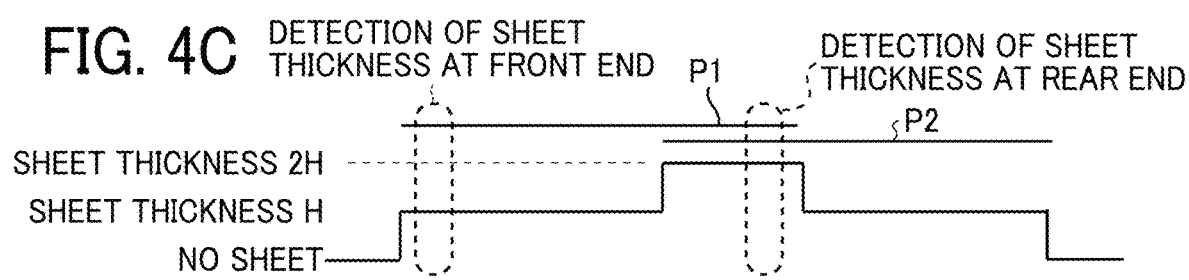

By contrast, as illustrated in FIG. 4C, when a plurality of sheets P1 and P2 are fed with overlap as in the sheet-passing state of FIG. 3C, a plurality of kinds of sheet thickness including the sheet thickness H and the sheet thickness 2H are output from the thickness sensor 62 for the length of the sheet P1 and the sheet P2 ($\approx$2X). More specifically, the sheet thickness 2H of the portion where a pair of sheets PT and P2 overlap each other is twice the sheet thickness H of the other portions. Accordingly, a disparity in sizes and a fed-with-overlap error can be distinguished from each other based on the presence or absence of such changes in the sheet thickness H. In other words, it is determined that a disparity in sizes is present when there is no variation in the sheet thickness H, and it is determined that a fed-with-overlap error is present when there is a variation in the sheet thickness H.

More concretely, in the present embodiment, the sheet thickness H at the front end, which is the sheet thickness at the start point of the prescribed length of time T, and the sheet thickness H2 at the rear end, which is the sheet thickness at the end point of the prescribed length of time T, are obtained. When the condition in the formula given below is satisfied, it is determined that a fed-with-overlap error is present.

$$H2 > H1 \times \alpha$$

In the above formula, $\alpha$ denotes a predetermined coefficient such as 1.5 that reflects the degree of margin. When the condition in the above formula is not met, it is determined that a disparity in sizes is present.

FIG. 3C and FIG. 4C illustrate a case in which a pair of sheets P1 and P2 are fed with overlap. Note that even when three or more sheets are ted with overlap, the sheet thicknesses H1 and the sheet thickness H2 that are detected by the thickness sensor 62 are different from each other without exception, and thus a disparity in sizes and a fed-with-overlap error can be distinguished from each other in a similar manner to the above.

In the present embodiment, FIG. 3D illustrates the operation to be performed when a plurality of sheets P1 and P2 of a predetermined size X are fed in pair. In such cases, the timing at which the output of the size sensor 61 is switched from a turned-on state to a turned-off state is equivalent to the timing when a sheet P of the desired size X is passed as illustrated in FIG. 3A. Accordingly, in this case, it is not possible to determine whether the sheet P is conveyed under normal operating conditions or fed in pair.

Figure 4D:
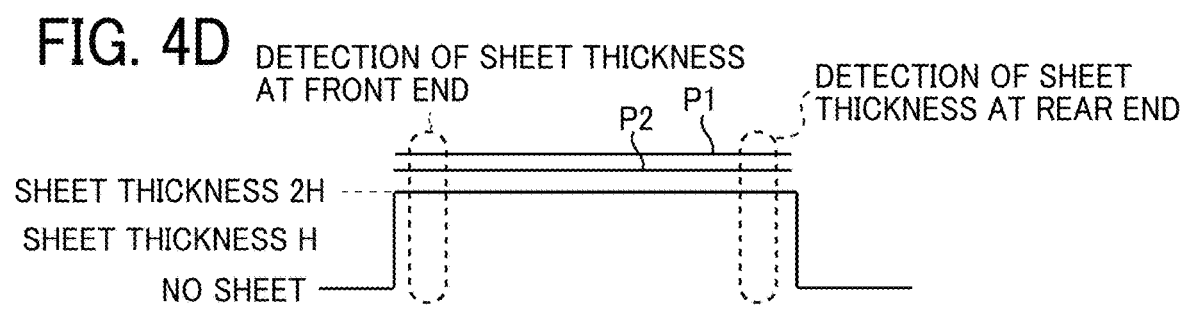

However, as illustrated in FIG. 4D, when a plurality of sheets P1 and P2 are fed in pair, the thickness sensor 62 outputs, for the length X of the sheet P1 and the sheet P2, sheet thickness 2H whose thickness value is greater than a value under normal operating conditions. In particular, the thickness value of the sheet thickness 2H is twice as much as the sheet thickness of one sheet because of a pair of sheets P1 and P2. As described above, a distinction can be made between normal operating conditions and fed-in-pair conditions based on the differences in sizes of sheet thickness. Such distinction may be referred to as a fed-in-pair detection where appropriate in the following description.

More specifically, in the present embodiment, the sheet thickness H1 at the front end of the sheet P is compared with the sheet thickness H1' at the front end of the sheet P that has passed previously. When the condition given below is satisfied, it is determined that a fed-in-pair error is present.

$$H1 > H1' \times \alpha$$

When the condition in the above formula is not met, it is assumed in the present embodiment that the sheet P is conveyed under normal operating conditions.

Alternatively, the information about the sheet thickness may be taken into consideration as the information about the sheet P that is input through the operation panel 100 in addition to or in place of the size data, and the obtained thickness data may be compared with the sheet thickness H detected by the thickness sensor 62 to perform fed-in-pair detection.

As described above, the detection device 60 according to the present embodiment can distinguish a disparity in sizes from a fed-with-overlap error. Further, a fed-with-overlap error can be distinguished from a fed-in-pair error, and a fed-in-pair error can be distinguished from a disparity in sizes. In other words, even if there are a plurality of causes that make the sheet P not conveyed under normal operating conditions, such multiple causes can be detected in a distinguishable manner. Due to such a configuration, when the sheet P is not conveyed under normal operating conditions, appropriate measures against the problem based on the cause can be presented to a user.

In particular, in the present embodiment, when it is determined that the sheet P is not conveyed under normal operating conditions, notification of such an error in the conveyance is provided, and control is made so as to terminate the conveyance of the sheet P.

More specifically, when a disparity in sizes is present, a message such as "Printing is terminated because there is a high probability that sheets of different sizes are set in the feeding device. Follow the instructions given below. Please remove the jammed sheet in the conveyance path, and set sheets of appropriate size" is displayed on the operation panel 100. When a fed-with-overlap error or a fed-in-pair error is present, a message such as "Printing is terminated because there is a high probability that two or more sheets are fed from the feeding device in error. Follow the instructions given below. Please remove the jammed sheet in the conveyance path" is displayed on the operation panel 100. In either case, the terminated printing is resumed after the paper jam or sheet jam has been handled appropriately.

Due to such a configuration, when the sheet P is not conveyed under normal operating conditions, appropriate measures against the problem can be taken based on the cause.

The controlling processes that are performed by the detection device 60 are described below with reference to the flowchart of FIG. 5.

Figure 5:
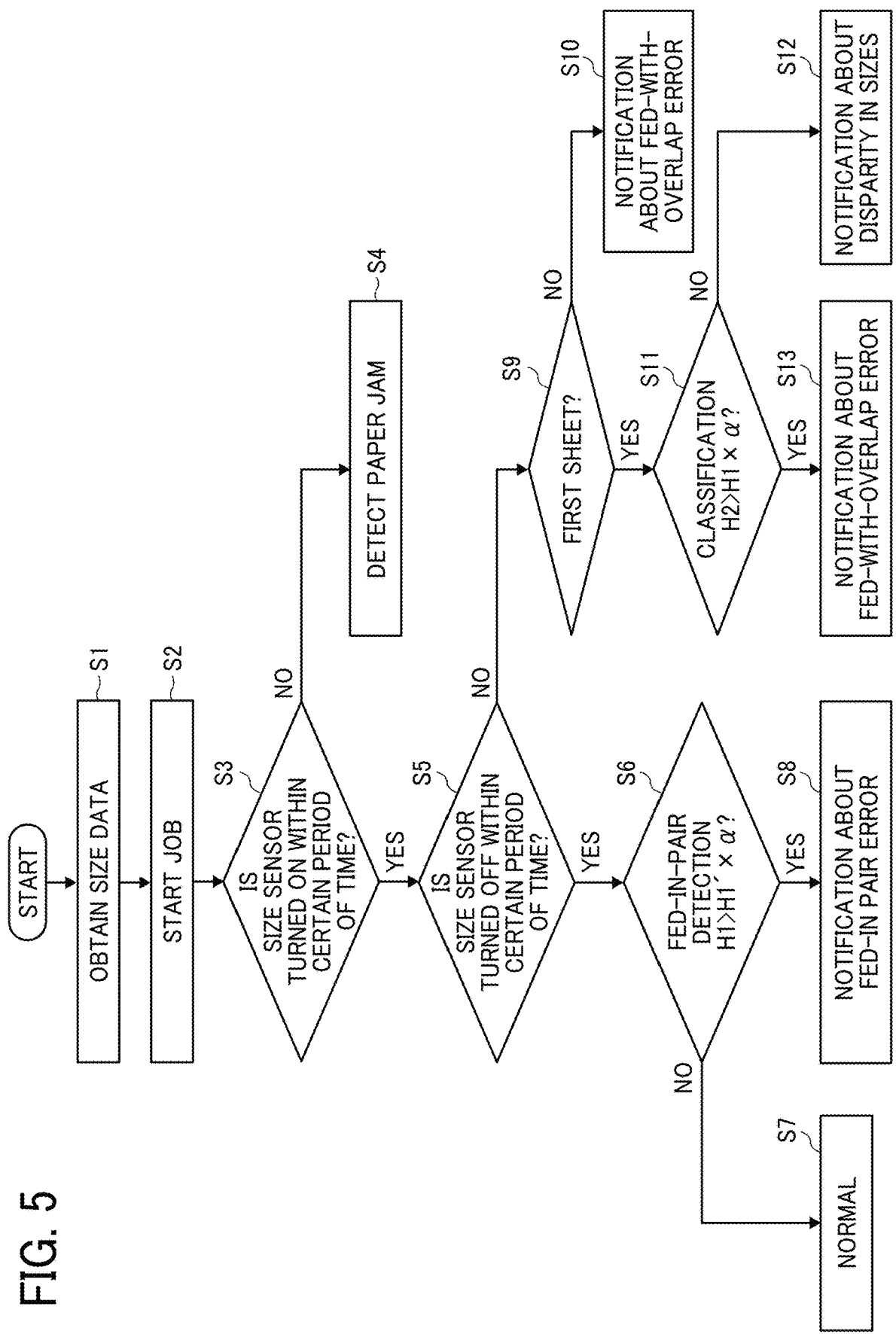
FIG. 5 is a flowchart of the control processes performed by a detection device, according to an embodiment of the present disclosure.

As illustrated in FIG. 5, in a step S1, firstly, the size data of the sheet P is obtained based on the information about a printing job input through the operation panel 100. At the same time, the controller 70 sets the prescribed length of time T based on the size data.

Then, in a step S3, when a printing job is started in the step S2, whether the output of the size sensor 61 is turned on within a certain length of time is determined, Such a certain length of time is the length of time elapsed since the sheet P is fed and conveyed from the selected feeding device such as the feeding device 13 on the downside under normal operating conditions before reaching the position of the size sensor 61. Accordingly, when the output of the size sensor 61 is not turned on within a certain length of time in the step S3, it is assumed that a paper jam or sheet jam has occurred to the sheet P, and in a step S4, a message indicating that such an error is present is displayed on the operation panel 100 and the conveying operation is terminated.

By contrast, when the output of the size sensor 61 is turned on within a certain length of time in the step S3, it is assumed that no paper jam or sheet jam has occurred to the sheet P, and in a step S5, whether the output of the size sensor 61 is turned off within the prescribed length of time T after the output of the size sensor 61 is turned on is then determined.

When the output of the size sensor 61 is turned off and disabled within the prescribed length of time T in the step S5, it is determined that a disparity in sizes or a ted-with-overlap error is not present, and fed-in-pair detection is performed in a step S6.

More specifically, as described above with reference to FIG. 3D and FIG. 4D, the sheet thickness H1 at the front end of the sheet P is compared with the sheet thickness H1' at the front end of the sheet P that has passed previously, and whether the condition given below is satisfied is determined.

$H1 = H1' \times \alpha.$

Then, when such a condition is satisfied, it is assumed that a fed-in-pair error is present, and in a step S8, a message indicating that such an error is present is displayed on the operation panel 100 and the conveying operation or the printing operation is terminated.

By contrast, when such a condition is not satisfied, it is assumed that no fed-in-pair error is present and the sheets P are being conveyed under normal operating conditions, and in a step S7, the conveying operation and the printing operation continues on an as-is basis.

By contrast, when the output of the size sensor 61 is not turned off and is disabled within the prescribed length of time T in the step S5, it is determined that a disparity in sizes or a fed-with-overlap error is present. Then, in a step S9, whether the determination relates to the first sheet in the continuous sheet-passing operation is determined.

When it is determined in the above step that the determination relates to the first sheet, in a step S11, classification is performed. More specifically, as described above with reference to FIG. 3B, FIG. 3C, FIG. 4B, and FIG. 4C, the sheet thickness H1 at the front end of the sheet and the sheet thickness H2 at the rear end of the sheet are obtained, and whether the condition given below is satisfied is determined based on the obtained sheet thickness.

$H2 > H1 \times \alpha$

Then, when such a condition is satisfied, it is assumed that a fed-with-overlap error is present, and in a step S13, a message indicating that such an error is present is displayed on the operation panel 100 and the conveyance operation is terminated.

By contrast, when such a condition is not satisfied, it is determined that a disparity in sizes is present, and in a step S12, a message indicating that such an error is present is displayed on the operation panel 100 and the conveyance operation is terminated.

On the other hand, when it is determined in the step S9 that the determination does not relate to the first sheet in the continuous sheet-passing operation, it is determined that a fed-with-overlap error is present and no classification is not performed. Then, in a step S10, a message indicating that such an error is present is displayed on the operation panel 100, and the conveyance operation is terminated.

In other words, when a plurality of sheets are continuously conveyed, classification is performed only when the first sheet is conveyed. Regarding the second sheet and the following sheets, it is determined that a fed-with-overlap error is present when the size data does not match the size in the direction of conveyance detected by the size sensor 61.

Control is performed as described above because it is sufficient as long as the first sheet is checked as to whether the size of the sheet set in the feeding device is different from the size data that is determined in advance and it is not necessary to check the second sheet and the following sheets. In other words, as a plurality of sheets P are set in the feeding devices 12 and 13 as a bundle of sheets, as long as the first sheet has the size as intended, it is not expected that the second sheet and the following sheets have an unintended size. For this reason, classification in which a disparity in sizes and a fed-with-overlap error are distinguished from each other is performed only for the first sheet. When the output of the size sensor 61 is not turned off within the prescribed length of time X for the second sheet P and the following sheets P, it is consistently determined that a fed-with-overlap error is present.

As described above, the detection device 60 according to the present embodiment is a detection device that determines whether the sheet P is being conveyed under normal operating conditions, and includes the size sensor 61 that detects the size of the sheet P being conveyed in the direction of conveyance, and the thickness sensor 62 that detects the thickness H of the sheet P being conveyed. What is more, when the size data obtained in advance about the size of the sheet P being conveyed in the direction of conveyance does not match the size in the direction of conveyance detected by the size sensor 61, the detection device 60 according to the present embodiment performs classification to distinguish a disparity in sizes of the sheet P being conveyed from a fed-with-overlap error occurring to the sheet P being conveyed, based on the detection results of the thickness sensor 62.

Due to such configurations as described above, even if there are a plurality of causes that make the sheet P not conveyed under normal operating conditions, such multiple causes can be detected in a distinguishable manner.

In the above description, the embodiments of the present disclosure are applied to the detection device 60 provided for the image forming apparatus 1 that does monochrome image formation. However, no limitation is intended thereby, and as a matter of course, the embodiments of the present disclosure may be applied to the detection device 60 provided for image forming apparatuses that do color image formation.

In the above description, the embodiments of the present disclosure are applied to the detection device 60 provided for the image forming apparatus 1 that adopts electrophotography. However, no limitation is intended thereby, and the embodiments of the present disclosure may be applied to a detection device provided for image forming apparatuses that adopt other various kinds of methodologies. For example, the embodiments of the present disclosure may be applied to a detection device provided for a mimeographic printing machine or an ink-jet image forming apparatus.

In the above description, the embodiments of the present disclosure are applied to the detection device 60 that performs the detection to determine whether the sheet fed from the feeding devices 12 and 13 are being conveyed under normal operating conditions. However, no limitation is indicated thereby, and the embodiments of the present disclosure may be applied to a detection device that performs the detection to determine whether a document D that serves as a sheet fed from the document conveyance unit 10 that serves as an automatic document feeder (ADF) is being conveyed under normal operating conditions.

In the present embodiment, the positions or the number of the size sensors 61 and the thickness sensors 62 are not limited to those illustrated in FIG. 1, and can be modified as desired without departing from the spirit or the technical ideas of the embodiments of the present disclosure.

Such a configuration also exerts effects similar to the above-described effects of the present embodiment.

Further, for example, the number, position, and the shape of the above components are not limited to those of the present embodiment, and may be changed to any desired number, position, and shape suitable for implementing the embodiments of the present disclosure.

In the embodiments of the present disclosure, the term sheet may include all sheet-like recording mediums such as coated paper, label paper, an overhead projector (OHP) sheet, and a film sheet in addition to a standard sheet of paper.

Note that numerous additional modifications and variations are possible in light of the above teachings. It is therefore to be understood that within the scope of the appended claims, the embodiments of the present disclosure may be practiced otherwise than as specifically described herein. For example, elements and/or features of different illustrative embodiments may be combined with each other and/or substituted for each other within the scope of this disclosure and appended claims.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. A detection device comprising:
a size sensor configured to detect a size of a sheet in a direction of conveyance, the sheet being conveyed when detected by the size sensor;
a thickness sensor configured to detect a thickness of the sheet; and
circuitry configured to distinguish between a disparity in sizes occurring to the sheet and a fed-with-overlap error occurring to the sheet based on the thickness of the sheet detected by the thickness sensor when the size detected by the size sensor is different from information obtained in advance about the size of the sheet in the direction of conveyance.

2. The detection device according to claim 1, wherein the thickness sensor is disposed downstream from the size sensor in the direction of conveyance.

3. The detection device according to claim 1, wherein the circuitry is configured to distinguish between the disparity in sizes and the fed-with-overlap error based on a variation in the thickness detected by the thickness sensor within a prescribed length of time determined by the information.

4. The detection device according to claim 3, wherein, when there is no variation exceeding a prescribed value in the thickness detected by the thickness sensor within the prescribed length of time, the circuitry is configured to determine that the disparity in sizes is present, and wherein, when there is a variation exceeding the prescribed value in the thickness detected by the thickness sensor within the prescribed length of time, the circuitry is configured to determine that the fed-with-overlap error is present.

5. The detection device according to claim 1,
wherein, when a plurality of sheets including the sheet are continuously conveyed, the circuitry is configured to distinguish between the disparity in sizes and the fed-with-overlap error only when first one of the plurality of sheets is conveyed, and wherein the circuitry is configured to determine that the fed-with-overlap error is present when second and following ones of the plurality of sheets are conveyed and the size detected by the size sensor is different from the information.

6. The detection device according to claim 1,
wherein, when the information matches the size in the direction of conveyance detected by the size sensor, the circuitry is configured to determine whether a fed-in-pair error is present for the sheet based on the thickness detected by the thickness sensor.

7. The detection device according to claim 1,
wherein the circuitry is configured to provide notification of an error in conveyance and stop conveying the sheet in response to a determination that the sheet is not conveyed under normal operating conditions.

8. An image forming apparatus comprising:
a detection device including:
a size sensor configured to detect a size of a sheet in a direction of conveyance, the sheet being conveyed when detected by the size sensor;
a thickness sensor configured to detect a thickness of the sheet;
a printer engine that prints an image on the sheet; and
circuitry configured to distinguish between a disparity in sizes occurring to the sheet and a fed-with-overlap error occurring to the sheet based on the thickness of the sheet detected by the thickness sensor when the size detected by the size sensor is different from information obtained in advance about the size of the sheet in the direction of conveyance.

9. The detection device according to claim 8,
wherein the thickness sensor is disposed downstream from the size sensor in the direction of conveyance.

10. The detection device according to claim 8,
wherein the circuitry is configured to distinguish between the disparity in sizes and the fed-with-overlap error based on a variation in the thickness detected by the thickness sensor within a prescribed length of time determined by the information.

11. The detection device according to claim 10,
wherein, when there is no variation exceeding a prescribed value in the thickness detected by the thickness sensor within the prescribed length of time, the circuitry is configured to determine that the disparity in sizes is present, and wherein, when there is a variation exceeding the prescribed value in the thickness detected by the thickness sensor within the prescribed length of time, the circuitry is configured to determine that the fed-with-overlap error is present.

12. The detection device according to claim 8,
wherein, when a plurality of sheets including the sheet are continuously conveyed, the circuitry is configured to distinguish between the disparity in sizes and the fed-with-overlap error only when first one of the plurality of sheets is conveyed, and wherein the circuitry is configured to determine that the fed-with-overlap error is present when second and following ones of the plurality of sheets are conveyed and the size detected by the size sensor is different from the information.

13. The detection device according to claim 8,
wherein, when the information matches the size in the direction of conveyance detected by the size sensor, the circuitry is configured to determine whether a fed-in-pair error is present for the sheet based on the thickness detected by the thickness sensor.

14. The detection device according to claim 8,
wherein the circuitry is configured to provide notification of an error in conveyance and stop conveying the sheet in response to a determination that the sheet is not conveyed under normal operating conditions.

* * * * *